(12) United States Patent
Pudvay (10) Patent No.: US 8,755,978 B2
(45) Date of Patent: Jun. 17, 2014

(54) SYSTEM AND METHOD FOR DETERMINING VEHICLE SHIFTER POSITION

(75) Inventor: Stephen Lewis Pudvay, Howell, MI (US)

(73) Assignee: GM Global Technology Operations LLC

( * ) Notice: Subject to any disclaimer, the term of this patent is extended or adjusted under 35 U.S.C. 154(b) by 554 days.

(21) Appl. No.: 13/020,100

(22) Filed: Feb. 3, 2011

(65) Prior Publication Data

US 2012/0095656 A1   Apr. 19, 2012

Related U.S. Application Data

(60) Provisional application No. 61/392,627, filed on Oct. 13, 2010.

(51) Int. Cl.
*F16H 59/10* (2006.01)

(52) U.S. Cl.
USPC ..... 701/51; 701/1; 701/55; 701/64; 74/473.1; 74/473.12

(58) Field of Classification Search
USPC ................. 701/51, 1, 55, 64; 74/473, 473.1, 74/473.12; 477/155
See application file for complete search history.

(56) References Cited

U.S. PATENT DOCUMENTS

| | | | |
|---|---|---|---|
| 7,293,480 B2 * | 11/2007 | Matsui et al. ............... | 74/473.12 |
| 7,750,624 B2 * | 7/2010 | Heo et al. .................. | 324/207.23 |
| 2004/0035237 A1 * | 2/2004 | Matsui et al. ............... | 74/473.12 |
| 2004/0216549 A1 * | 11/2004 | Shiomi et al. ............... | 74/473.12 |
| 2005/0235771 A1 * | 10/2005 | Yokoyama ................. | 74/473.33 |
| 2006/0053930 A1 * | 3/2006 | Morita et al. ............... | 74/473.18 |
| 2006/0201272 A1 * | 9/2006 | Syamoto et al. ............. | 74/473.1 |
| 2008/0006113 A1 * | 1/2008 | Matsui et al. ................ | 74/473.1 |
| 2008/0042644 A1 | 2/2008 | Heo et al. | |
| 2011/0132122 A1 * | 6/2011 | Park et al. .................. | 74/473.12 |
| 2011/0132124 A1 * | 6/2011 | Park et al. .................. | 74/473.18 |
| 2012/0234124 A1 * | 9/2012 | Nozaki et al. .............. | 74/473.12 |

FOREIGN PATENT DOCUMENTS

DE    102005008383 A1    9/2005

\* cited by examiner

*Primary Examiner* — John R Olszewski
*Assistant Examiner* — Truc M Do (57) ABSTRACT

A system for controlling a transmission of a vehicle based on input from a shifter includes first, second, third, and fourth position sensors and a position determination module. The shifter includes a shift lever. The first and second position sensors sense first and second positions of the shift lever, respectively, with respect to first and second axes, respectively, wherein the first and second axes are orthogonal to one another. The third and fourth position sensors sense third and fourth positions of the shift lever, respectively, with respect to third and fourth axes, respectively, wherein the third and fourth axes are orthogonal to one another. In addition, the first and second axes are non-orthogonal to the third and fourth axes. The position determination module determines a position of the shift lever based on the first, second, third, and fourth positions.

20 Claims, 5 Drawing Sheets

SYSTEM AND METHOD FOR DETERMINING VEHICLE SHIFTER POSITION

CROSS-REFERENCE TO RELATED APPLICATIONS

This application claims the benefit of U.S. Provisional Application No. 61/392,627, filed on Oct. 13, 2010. The disclosure of the above application is incorporated herein by reference in its entirety.

FIELD

The present disclosure relates to transmission control systems and more particularly to systems and methods for determining a position of a vehicle shifter and controlling a transmission accordingly.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel (A/F) mixture within cylinders to drive pistons that rotatably turn a crankshaft generating drive torque. The drive torque may be transferred to a driveline (e.g., wheels) of a vehicle via a transmission. For example, an automatic transmission may be coupled to the crankshaft by a fluid coupling such as a torque converter. The transmission may include a plurality of gear ratios that multiply the drive torque generated at the crankshaft. The transmission may also operate in a plurality of modes (e.g., park, reverse, neutral, drive, low, etc.), that are controlled via input from a driver of the vehicle.

A shifter may translate the input from the driver of the vehicle to a requested mode of operation for the transmission. For example, the shifter may be located in a cabin of the vehicle near a center console. In "shift-by-wire" systems (also known as electronic transmission range selection, or ETRS systems), the shifter is not physically connected to the transmission. In other words, a controller may determine a position of the shifter (e.g., a position of a shift lever) and electronically control the transmission accordingly.

SUMMARY

A system for controlling a transmission of a vehicle based on input from a shifter includes first, second, third, and fourth position sensors and a position determination module. The first position sensor senses a first position of a shift lever with respect to a first axis, wherein the shifter includes the shift lever. The second position sensor senses a second position of the shift lever with respect to a second axis, wherein the second axis is orthogonal to the first axis. The third position sensor senses a third position of the shift lever with respect to a third axis. The fourth position sensor senses a fourth position of the shift lever with respect to a fourth axis, wherein the fourth axis is orthogonal to the third axis, and wherein the first and second axes are non-orthogonal to the third and fourth axes. The position determination module determines a position of the shift lever based on the first, second, third, and fourth positions.

A method for controlling a transmission of a vehicle based on input from a shifter includes sensing a first position of a shift lever with respect to a first axis, wherein the shifter includes the shift lever, sensing a second position of the shift lever with respect to a second axis, wherein the second axis is orthogonal to the first axis, sensing a third position of the shift lever with respect to a third axis, sensing a fourth position of the shift lever with respect to a fourth axis, wherein the fourth axis is orthogonal to the third axis, and wherein the first and second axes are non-orthogonal to the third and fourth axes, and determining a position of the shift lever based on the first, second, third, and fourth positions.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In "shift-by-wire" systems (also known as electronic transmission range selection, or ETRS systems), a shifter is not physically connected to a transmission. Transmission control systems, therefore, may determine a position of the shifter to electronically control the transmission accordingly. For example, the position of the shifter may include a position of a shift lever that is physically controlled by a driver.

The determined position of the shifter, however, may be inaccurate. In other words, conventional transmission control systems may inaccurately determine the position of the shifter and thus incorrectly determine a requested mode of operation for the transmission. For example, position sensors used to determine the position of the shifter may malfunction or fail. Moreover, extensive calibration may be required, which may increase costs and/or complexity.

Accordingly, a system and method are presented for improved determination of a position of a shifter in a vehicle implementing an ETRS system (i.e., shift-by-wire). The system and method may determine a position of the shifter (i.e., a shift lever) based on at least three measurements from four position sensors. In other words, the system and method may handle single point failures (i.e., when one of the four position sensors fails). The four position sensors may be configured to sense the position of the shift lever along four different axes, respectively. More specifically, first and second position sensors may measure position corresponding to a first set of orthogonal axes and third and fourth position sensors may measure position corresponding to a second set of orthogonal axes. Moreover, the first and second sets of orthogonal axes are non-orthogonal to each other (e.g., 45 degree rotation).

The system and method may then determine first and second requested modes of operation for the transmission based on the determined position and first and second methods, respectively. The first method may include determining whether the determined position is within a distance (e.g., radius) from predetermined points corresponding to various modes of operation for the transmission. The second method may include determining whether the determined position is within predetermined rectangular regions corresponding to various modes of operation for the transmission. For example, the modes of operation for the transmission may include park, reverse, neutral, drive, and/or low (hereinafter referred to as "PRNDL").

The system and method may then compare the first and second requested modes of operation for the transmission to verify accuracy. In other words, the first and second methods may be similar to minimize errors but may also be dissimilar enough to avoid failures of both methods. More specifically, when the first and second requested modes of operation for the transmission are the same, the system and method may command the transmission accordingly (i.e., according to the requested mode of operation). When the first and second determined modes of operation for the transmission are different, however, the system and method may select a predetermined mode of operation (e.g., neutral) and command the transmission accordingly. The system and method may also generate a fault (e.g., an error signal) when the first and second requested modes of operation are different.

Figure 1:
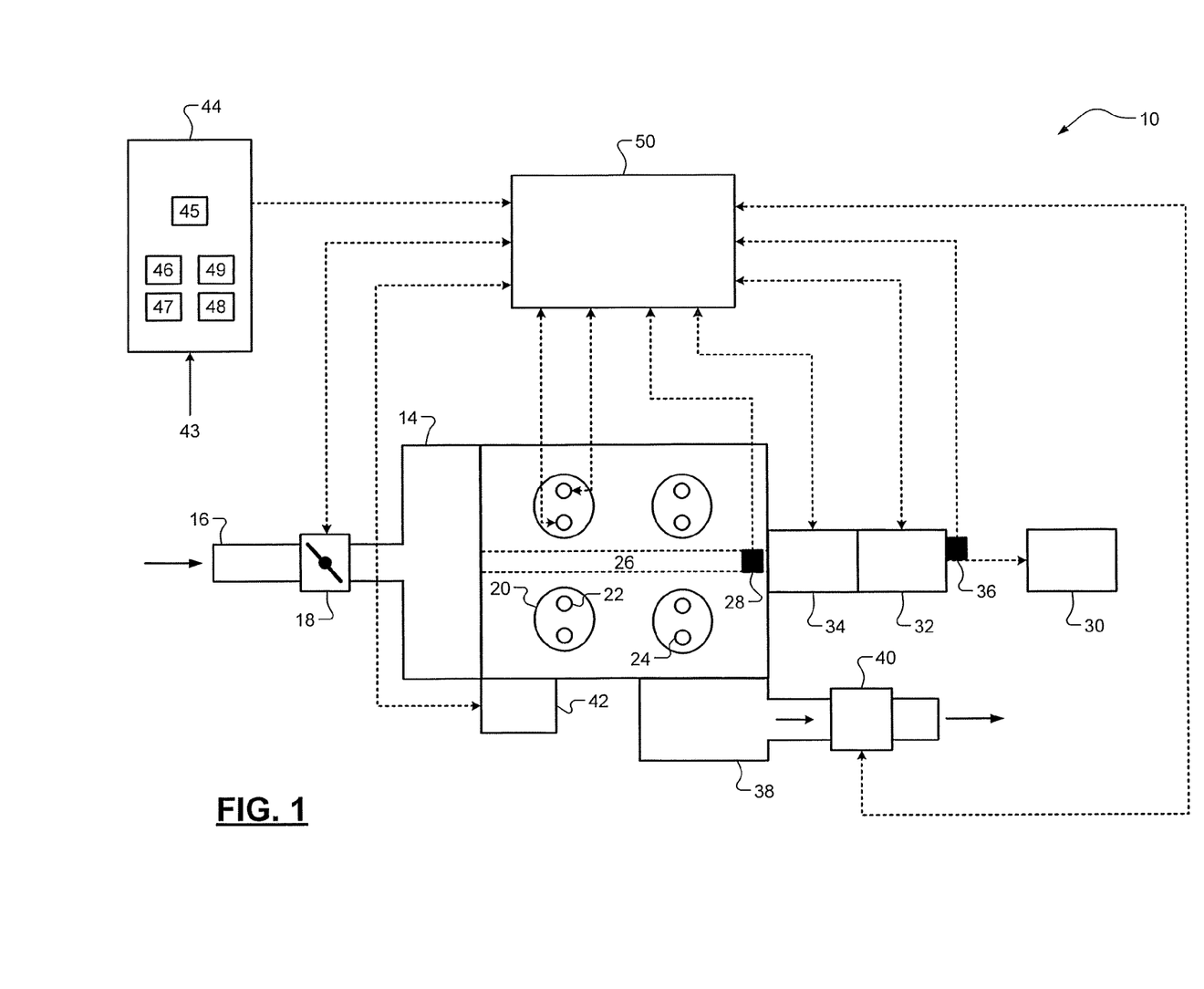
FIG. 1 is a functional block diagram of an exemplary engine system according to the present disclosure.

Referring now to FIG. 1, powertrain system 10 includes an engine 12. For example, the engine 12 may include a spark ignition (SI) combustion engine, a compression ignition (CI) engine (e.g., a diesel engine), or a homogeneous charge compression ignition (HCCI) engine. The powertrain system 10, however, may also include a different type of engine and/or additional components, such as in a hybrid engine system (e.g., an electric motor, a battery system, a generator, etc.). Therefore, while the following description describes an engine powered vehicle, the system and method of the present disclosure may also be implemented for transmissions in other vehicles such as hybrid vehicles, electric vehicles (e.g., extended-range electric vehicles, or EREVs), etc.

The engine 12 draws air into an intake manifold 14 through an inlet system 16 that may be regulated by a throttle 18. For example, the throttle 18 may be electronically controlled (e.g., electronic throttle control, or ETC). The engine 12 may include one or more sensors (not shown) that measure air flow and/or pressure (e.g., a mass air flow, or MAF sensor, a manifold absolute pressure, or MAP sensor, etc.). The air in the intake manifold 14 may be distributed to a plurality of cylinders 20. While four cylinders are shown, other numbers of cylinders may be implemented.

The air in the cylinders 20 may be mixed with fuel from a plurality of fuel injectors 22 to create an air/fuel (A/F) mixture. For example, the fuel injectors 22 may inject fuel via intake ports of the cylinders 20, respectively (e.g., port fuel injection), or directly into the cylinders 20, respectively (e.g., direct fuel injection). The A/F mixture may be combusted within the cylinders 20 to drive pistons (not shown) that rotatably turn a crankshaft 26 generating drive torque. An engine speed sensor 28 may measure a rotational speed of the crankshaft 26 (e.g., in revolutions per minute, or RPM).

SI combustion engines may compress the A/F mixture within the cylinders 20 using the pistons (not shown) and combust the compressed A/F mixture via spark from a plurality of spark plugs 24. HCCI engines, on the other hand, may compress the A/F mixture until automatic ignition and/or may provide spark "assist" using the spark plugs 24. CI engines (e.g., diesel engines), however, may not include the spark plugs 24. In other words, CI engines may compress the air within the cylinders 20 using the pistons (not shown) and inject fuel into the compressed air (e.g., direct fuel injection) causing the compressed A/F mixture to combust.

The drive torque generated by the combustion may be transferred from the crankshaft 26 to a driveline 30 (e.g., wheels) of the vehicle via a transmission 32. The transmission 32 may be coupled to the crankshaft 26 via a fluid coupling such as a torque converter 34. A transmission output shaft speed (TOSS) sensor 36 may measure a rotational speed of an output shaft of the transmission 32 (e.g., in RPM). For example, the measurement of the TOSS sensor 36 may indicate a speed of the vehicle. Exhaust gas resulting from combustion may be expelled from the cylinders 20 into an exhaust manifold 38. An exhaust treatment system 40 may treat the exhaust gas to decrease emissions before the exhaust gas is released into the atmosphere.

The exhaust gas may also be used to power a turbocharger 42. The turbocharger 42 may increase ("boost") the MAP by compressing the air drawn into intake manifold 14, which may result in increased drive torque (i.e., when combined with more fuel). While turbocharger 42 is shown, however, the powertrain system 10 may also include a different type of forced air induction (e.g., a supercharger). Additionally, exhaust gas may be introduced into the intake manifold 14 via an exhaust gas recirculation (EGR) system (not shown). For example, the EGR system (not shown) may be implemented in CI engines (e.g., diesel engines) and HCCI engines.

A shifter 44 controlled by a driver of the vehicle translates driver input (represented by signal 43) to a requested mode of operation for the transmission 32. The shifter 44 may further include a shift lever 45 and position sensors 46-49. For example, the driver may input a requested mode of operation for the transmission 32 by moving the shift lever 45. Additionally, while four position sensors 46-49 are shown, the shifter 44 may include more position sensors. A control module 50, described in more detail below, may implement a "shift-by-wire" system for controlling the transmission 32. In other words, the control module 50 may determine the position of the shift lever and the requested mode of operation for the transmission 32 and then control the transmission 32 accordingly.

The control module 50 may receive signals from the throttle 18, the fuel injectors 22, the spark plugs 24, the engine speed sensor 28, the transmission 32, the torque converter 34, the TOSS sensor 36, the exhaust treatment system 40, the turbocharger 42, and/or the shifter 44 (e.g., position sensors 46-49). The control module 50 may control the throttle 18 (e.g., ETC), the fuel injectors 22, the spark plugs 24, the transmission 32, the torque converter 34, the exhaust treatment system 40, and/or the turbocharger 42. The control module 50 may also implement the system or method of the present disclosure. Additionally, while a single control module 50 is shown, more than one control module may be implemented (e.g., an engine control module, a transmission control module, etc.).

Figure 2A:
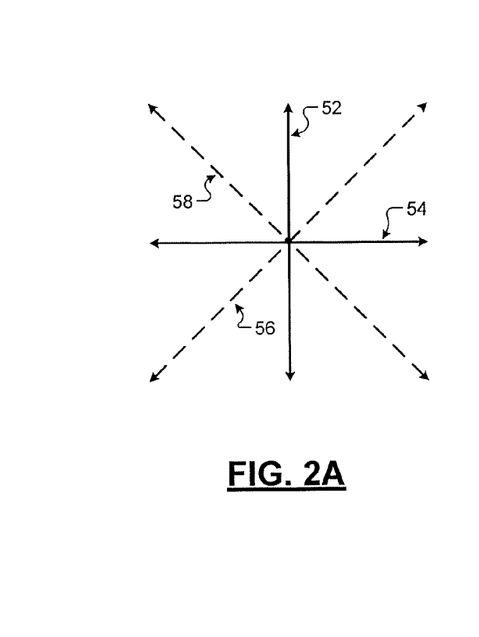
FIG. 2A illustrates two exemplary sets of orthogonal axes, the two sets of axes being non-orthogonal to each other.
Figure 2B:
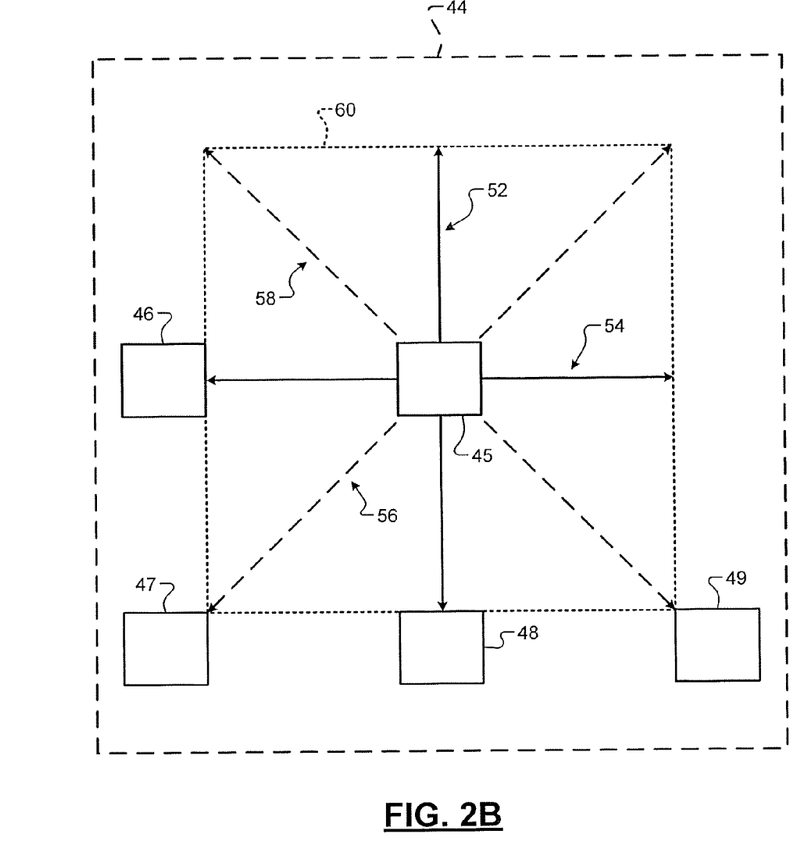
FIG. 2B is a cross-section of an exemplary shifter according to the present disclosure.

Referring now to FIGS. 2A-2B, the shifter 44 is shown in more detail. More specifically, FIG. 2A illustrates a first set of orthogonal axes 52, 54 and a second set of orthogonal axes 56, 58. As shown, the first and second sets of orthogonal axes are also non-orthogonal with respect to each other. For example, the second set of orthogonal axes 56, 58 may be rotated counter-clockwise by 45 degrees with respect to the first set of orthogonal axes 52, 54. In other words, for example, the first and second sets of orthogonal axes 52-58 may be used collectively to determine the position of a joystick-type shifter.

FIG. 2B illustrates a cross-section of the shifter 44. The shifter 44 includes the shift lever 45 and the position sensors 46-49. The position sensors 46-49 are arranged to sense the position of the shifter 44 (i.e., the shift lever 45) based on the first and second sets of orthogonal axes of FIG. 2A. For example, the position sensors 46-49 may include capacitive position sensors, magnetic position sensors, optical positions sensors, or other suitable types of position sensors.

Specifically, position sensor 48 may sense along axis 52, position sensor 46 may sense along axis 54, position sensor 47 may sense along axis 56, and position sensor 49 may sense along axis 58. Moreover, the shifter 44 (i.e., the shifter 45) may include a defined area of movement 60. In other words, the position of the shifter 44 (i.e., the shift lever 45) may be limited to a position within the defined area of movement 60.

Figure 3:
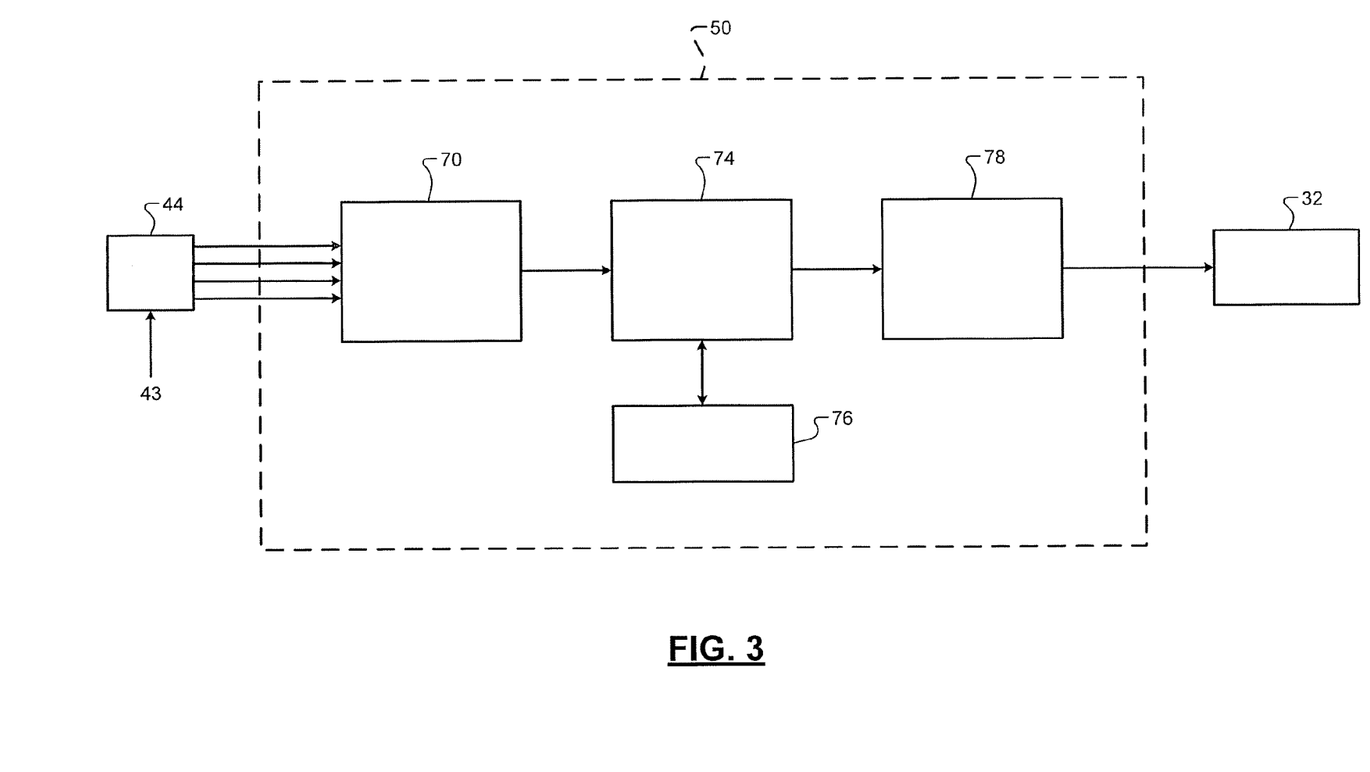
FIG. 3 is a functional block diagram of an exemplary control module according to the present disclosure.

Referring now to FIG. 3, the control module 50 is shown in more detail. The control module 50 may include a position determination module 70, an input determination module 74, and a transmission control module 78. The control module 50 may also include memory (not shown) that stores determined and predetermined parameters. For example, the memory (not shown) may include non-volatile memory (NVM).

The position determination module 70 may receive position signals from the shifter 44. More specifically, the position determination module 70 may receive position signals from position sensors 46-49, respectively. The position determination module 70 determines a position of the shifter 44 (i.e., the shift lever 45) based on the received signals. More specifically, the position determination module 70 may determine the position of the shift lever 45 based on three or more of the measurements of the four position sensors 46-49. In other words, the position determination module 70 may handle single point faults (e.g., when one of the position sensors 46-49 fails).

The input determination module 74 receives the determined position from the position determination module 70. The input determination module 74 determines first and second request modes of operation for the transmission 32 based on the determined position and using first and second methods, respectively. The input determination module 74 may then compare the first and second requested modes of operation to verify accuracy.

Specifically, the first method includes determining whether the determined position is within a distance (e.g., radii) from predetermined points corresponding to different modes of operation for the transmission (e.g., PRNDL). Specifically, the defined area of movement 60 (see FIG. 2B) may include a plurality of predetermined points corresponding to the various modes of operation for the transmission 32. For example, the input determination module 74 may communicate with a position look-up table 76 which may store the plurality of predetermined points. Therefore, the first method may determine that the requested mode of operation is a mode of operation corresponding to a predetermined point nearest to the determined position. Additionally, for example only, having the first and second sets of orthogonal axes rotated 45 degrees with respect to each other may improve the performance of the first method.

The second method, on the other hand, includes determining whether the determined position is within predetermined rectangular regions corresponding to different modes of operation for the transmission (e.g., PRNDL). Specifically, the defined area of movement 60 (see FIG. 2B) may include a plurality of predetermined rectangular regions corresponding to the various modes of operation for the transmission 32. In other words, the defined area of movement 60 (see FIG. 2B) may be divided into the predetermined rectangular regions. For example, the input determination module 74 may use the position look-up table 76 which may store coordinates defining the plurality of predetermined rectangular regions. Therefore, the second method may determine that the requested mode of operation is a mode of operation corresponding to a calibrated rectangular area that includes the determined position.

The input determination module 74 may then compare the first and second requested modes of operation. In other words, the input determination module 74 may determine whether the first and second requested modes of operation are the same. More specifically, when the first and second requested modes of operation for the transmission 32 are the same, the input determination module 74 may send one of the first and second requested modes of operation to the transmission control module 78 (i.e., both are the same).

When the first and second determined modes of operation for the transmission 32 are different, however, the input determination module 74 may send a predetermined (i.e., default) mode of operation to the transmission control module 78. For example, the predetermined mode of operation may be neutral. The input determination module 74 may also generate an error signal (represented by signal 76) when the first and second requested modes of operation are different. For example, the error signal 76 may actuate a malfunction indicator lamp (MIL).

The transmission control module 78 receives the requested mode of operation for the transmission 32 from the input determination module 74. The transmission control module 78 controls the transmission according to the requested mode of operation. More specifically, the transmission control module 78 may command the transmission 32 to the requested mode of operation. For example, the transmission control module 78 may command the transmission 32 by generating one or more control signals for the transmission 32.

Figure 4A:
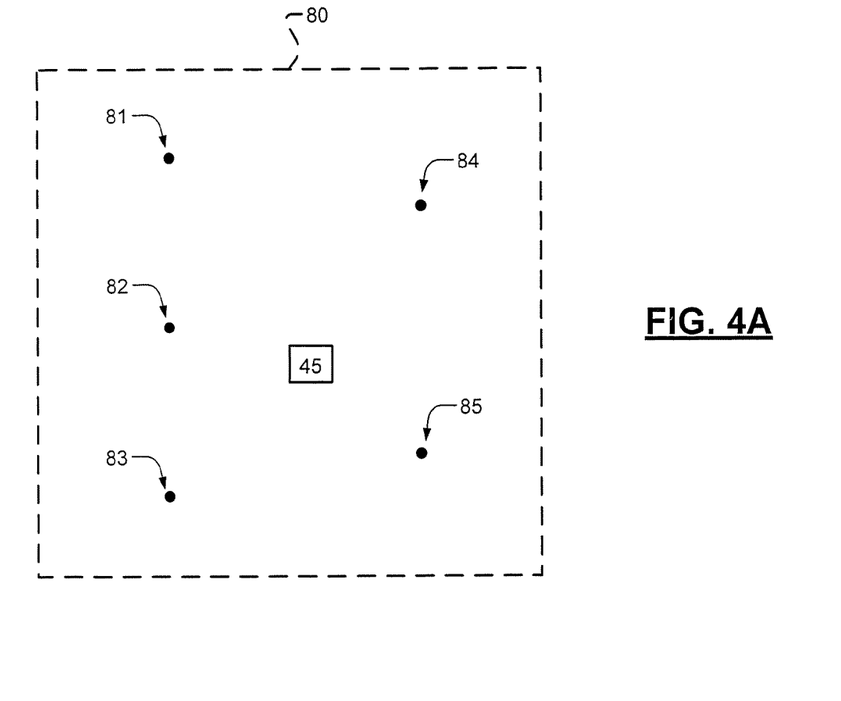
FIGS. 4A-4B illustrate exemplary first and second methods for determining a requested mode of operation for a transmission according to the present disclosure.
Figure 4B:
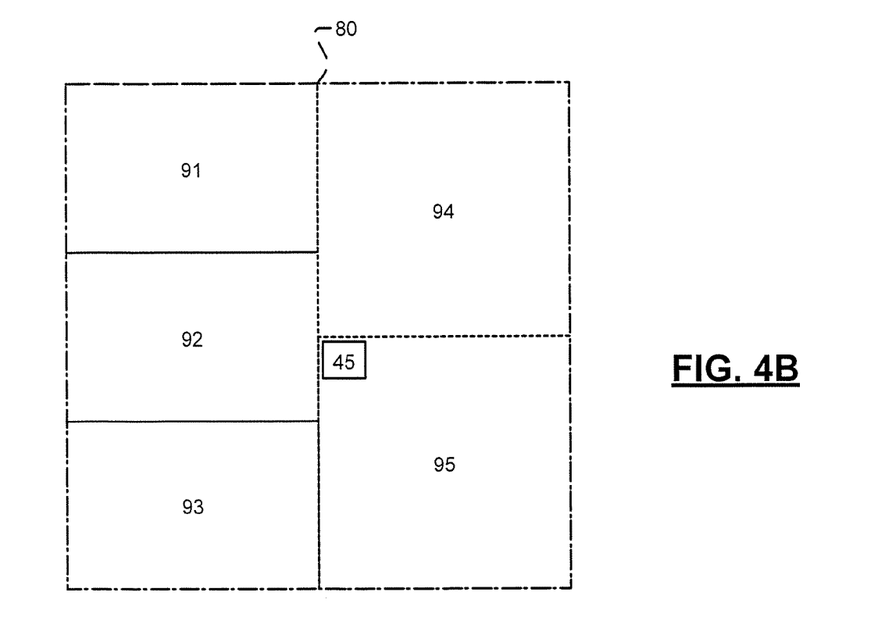

Referring now to FIGS. 4A-4B, the first and second methods are shown in more detail. FIG. 4A illustrates the first method (e.g., the circles method). A defined area of movement 80 includes a plurality of predetermined points 81-85 corresponding to various modes of operation of the transmission 32. For example only, the predetermined points 81-85 may correspond to drive (D), neutral (N), reverse (R), manual upshift (+), and manual downshift (−), respectively. While a plurality of predetermined points 81-85 are described, the defined area of movement 80 may alternatively include a plurality of circular regions (i.e., centered at the predetermined points 81-85) or a plurality of irregular regions having fixed distances from the predetermined points 81-85).

The shifter 45 may be moved to a desired position by the driver of the vehicle. The first method may then determine which of the plurality of predetermined points 81-85 is nearest to the shifter 45. As shown, the shifter 45 may be nearest to either predetermined point 82 (neutral) or predetermined point 85 (manual downshift). Thus, the first method may output one of neutral and manual downshift as the first requested mode of operation.

FIG. 4B, on the other hand, illustrates the second method (e.g., the rectangles method). A defined area of movement 90 may include a plurality of predetermined rectangular regions 91-95. For example, the predetermined rectangular regions 91-95 may not overlap and may cover the entire defined area of movement 90. For example only, the predetermined rectangular regions 91-95 may correspond to drive (D), neutral (N), reverse (R), manual upshift (+), and manual downshift (−), respectively. The shifter 45 may be moved to a desired position by the driver of the vehicle. The second method may then determine which of the predetermined rectangular regions includes the shifter 45 (or a majority of the shifter 45). As shown, predetermined rectangular region 85 (manual downshift) includes the shifter 45. Thus, the second method may output manual downshift as the second requested mode of operation.

Therefore, if the first method outputs manual downshift as the first requested mode of operation (i.e., if the shifter 45 is nearest to predetermined point 85), the first and second requested modes of operation are the same and the transmission 32 may be controlled accordingly. If the first method outputs neutral as the first requested mode of operation, however (i.e., if the shifter 45 is nearest to predetermined point 82), the first and second requested modes of operation are different and the transmission 32 may be controlled according to the predetermined mode of operation (e.g., neutral) and an error signal may be generated.

Figure 5:
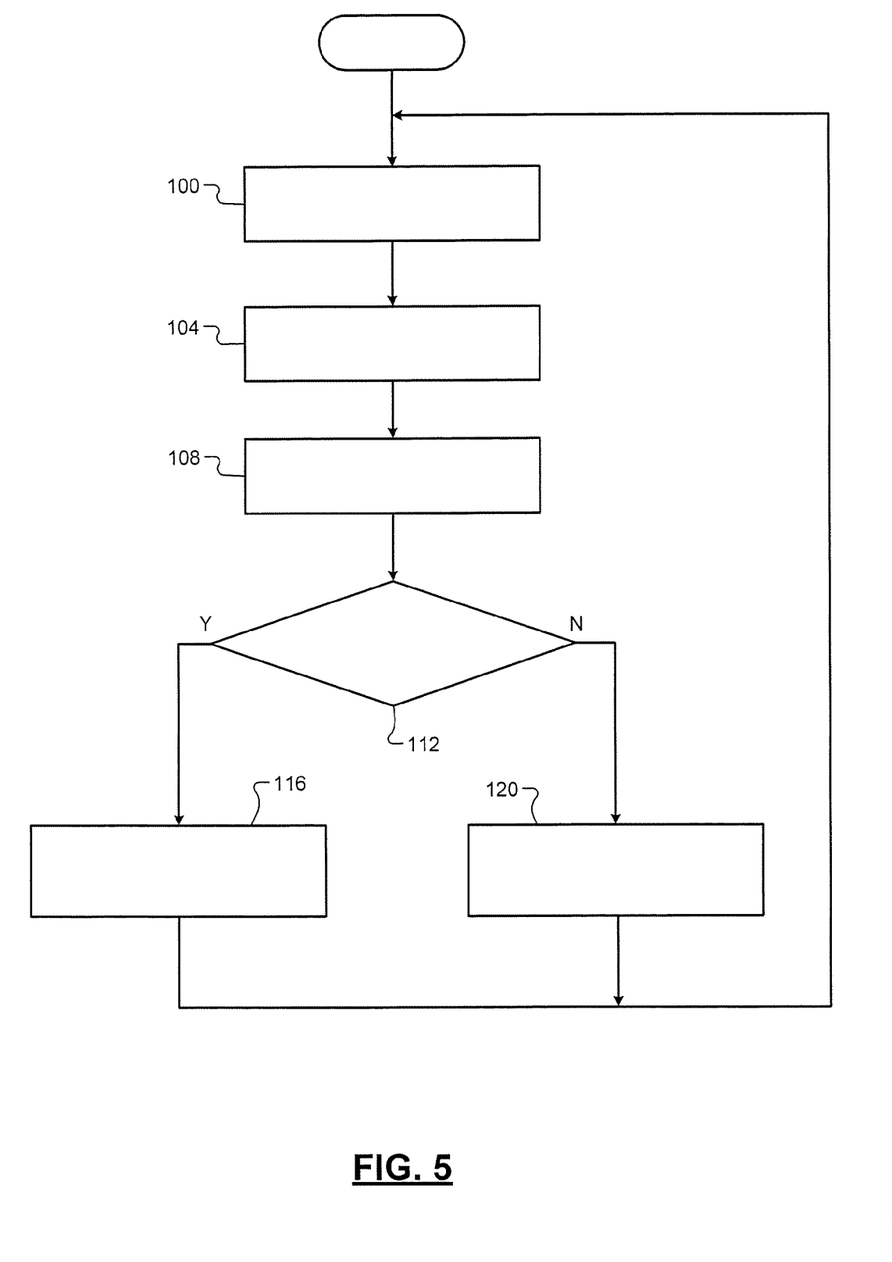
FIG. 5 is a flow diagram of a method for determining a requested mode of operation for a transmission and controlling the transmission according to the present disclosure.

Referring now to FIG. 5, a method for controlling the transmission 32 begins at 100. At 100, the control module 50 may determine the position of the shift lever 45. At 104, the control module 50 may determine the first requested mode of operation for the transmission 32 based on the determined position and using the first method. At 108, the control module 50 may determine the second requested mode of operation for the transmission 32 based on the determined position and using the second method.

At 112, the control module 50 may determine whether the first and second requested modes of operation for the transmission 32 are the same. If true, control may proceed to 116. If false, control may proceed to 120. At 116, the control module 50 may control the transmission 32 according to one of the first and second requested modes of operation. Control may then return to 100. At 120, the control module 50 may control the transmission 32 according to the predetermined mode of operation (e.g., neutral) and/or may generate an error signal. Control may then return to 100.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for controlling a transmission of a vehicle based on input from a shifter, comprising:
    a first position sensor that senses a first position of a shift lever with respect to a first axis, wherein the shifter includes the shift lever;
    a second position sensor that senses a second position of the shift lever with respect to a second axis, wherein the second axis is orthogonal to the first axis;
    a third position sensor that senses a third position of the shift lever with respect to a third axis;
    a fourth position sensor that senses a fourth position of the shift lever with respect to a fourth axis, wherein the fourth axis is orthogonal to the third axis, and wherein the first and second axes are non-orthogonal to the third and fourth axes; and
    a position determination module that determines a position of the shift lever based on the first, second, third, and fourth positions.

2. The system of claim 1, wherein the position determination module determines the position of the shift lever based on three of the first, second, third, and fourth positions when one of the first, second, third, and fourth position sensors fails.

3. The system of claim 1, wherein the third and fourth axes are rotated forty-five degrees with respect to the first and second axes.

4. The system of claim 1, further comprising an input determination module that determines a requested mode based on a comparison between first and second modes of the transmission, wherein the first and second modes of the transmission are based on the determined position of the shift lever and first and second methods, respectively.

5. The system of claim 4, wherein the first method includes determining a first mode of the transmission based on differences between the determined position and a plurality of predetermined points.

6. The system of claim 5, wherein each of the plurality of predetermined points corresponds to a mode of the transmission, and wherein the first mode includes a mode of the transmission corresponding to one of the plurality of predetermined points nearest to the determined position.

7. The system of claim 4, wherein the second method includes determining a second mode of the transmission based on differences between the determined position and a plurality of predetermined rectangular regions.

8. The system of claim 7, wherein each of the plurality of predetermined rectangular regions corresponds to a mode of the transmission, and wherein the second mode includes a mode of the transmission corresponding to one of the plurality of predetermined rectangular regions that includes the determined position.

9. The system of claim 4, further comprising a transmission control module that commands the transmission to operate in one of the first and second modes when the first and second modes are the same.

10. The system of claim 9, wherein the transmission control module generates an error signal and commands the transmission to operate in a predetermined mode when the first and second modes are different.

11. A method for controlling a transmission of a vehicle based on input from a shifter, comprising:
    sensing, using a first position sensor, a first position of a shift lever with respect to a first axis, wherein the shifter includes the shift lever;

sensing, using a second position sensor, a second position of the shift lever with respect to a second axis, wherein the second axis is orthogonal to the first axis;

sensing, using a third position sensor, a third position of the shift lever with respect to a third axis;

sensing, using a fourth position sensor, a fourth position of the shift lever with respect to a fourth axis, wherein the fourth axis is orthogonal to the third axis, and wherein the first and second axes are non-orthogonal to the third and fourth axes; and determining, using a position determination module, a position of the shift lever based on the first, second, third, and fourth positions.

12. The method of claim 11, wherein the position of the shift lever is determined based on three of the first, second, third, and fourth positions when one of the first, second, third, and fourth position sensors fails.

13. The method of claim 11, wherein the third and fourth axes are rotated forty-five degrees with respect to the first and second axes.

14. The method of claim 11, further comprising determining a requested mode based on a comparison between first and second modes of the transmission, wherein the first and second modes of the transmission are based on the determined position of the shift lever and first and second methods, respectively.

15. The method of claim 14, wherein the first method includes determining a first mode of the transmission based on differences between the determined position and a plurality of predetermined points.

16. The method of claim 15, wherein each of the plurality of predetermined points corresponds to a mode of the transmission, and wherein the first mode includes a mode of the transmission corresponding to one of the plurality of predetermined points nearest to the determined position.

17. The method of claim 14, wherein the second method includes determining a second mode of the transmission based on differences between the determined position and a plurality of predetermined rectangular regions.

18. The method of claim 17, wherein each of the plurality of predetermined rectangular regions corresponds to a mode of the transmission, and wherein the second mode includes a mode of the transmission corresponding to one of the plurality of predetermined rectangular regions that includes the determined position.

19. The method of claim 14, further comprising commanding the transmission to operate in one of the first and second modes when the first and second modes are the same.

20. The method of claim 19, further comprising generating an error signal and commanding the transmission to operate in a predetermined mode when the first and second modes are different.

* * * * *